(12) United States Patent
Chang et al.

(10) Patent No.: US 6,973,298 B2
(45) Date of Patent: Dec. 6, 2005

(54) LOCATION CAPABLE MOBILE HANDSET

(75) Inventors: Henry Chang, San Diego, CA (US); Douglas L. Dunn, San Diego, CA (US)

(73) Assignee: Kyocera Wireless Corp., San Diego, CA (US)

(*) Notice: Subject to any disclaimer, the term of this patent is extended or adjusted under 35 U.S.C. 154(b) by 309 days.

(21) Appl. No.: 10/402,608

(22) Filed: Mar. 27, 2003

(65) Prior Publication Data

US 2004/0192346 A1 Sep. 30, 2004

(51) Int. Cl.⁷ .......................... H04M 11/00; H04Q 7/20
(52) U.S. Cl. ............................... 455/404.2; 455/456.1
(58) Field of Search ................... 455/404.1, 404.2, 455/456.1, 456.6, 521

(56) References Cited

U.S. PATENT DOCUMENTS

| | | | |
|---|---|---|---|
| 5,479,482 A | 12/1995 | Grimes | |
| 5,797,093 A * | 8/1998 | Houde | 455/404.1 |
| 6,233,445 B1 * | 5/2001 | Boltz et al. | 455/404.2 |
| 6,240,285 B1 * | 5/2001 | Blum et al. | 455/404.1 |
| 6,295,454 B1 | 9/2001 | Havinis et al. | |
| 6,819,929 B2 * | 11/2004 | Antonucci et al. | 455/445 |

FOREIGN PATENT DOCUMENTS

EP 0789498 A2 8/1997

OTHER PUBLICATIONS

Christie, et al., "Development and Deployment of GPS Wireless Devices for E911 and Location Based Services"; Symposium, 2002; Palm Springs, CA, pp. 60-65, Apr. 2002.
Djuknic, et al., "Geolocation and Assisted-GPS", Bell Laboratories, Lucent Technologies, Whippany, NJ, pp. 1-10, Feb. 2001.
Garmin Corporation, "GPSMAP 180 Owner's Manual and Reference", pp. 34-46, Mar. 1999 (XP-002297874).

* cited by examiner

*Primary Examiner*—Benny Q. Tieu

(57) ABSTRACT

Briefly, the location capable mobile handset allows the user to provide a call recipient with the location of an unsuccessful attempted emergency call. In one specific example, the call may be an E911 call to a PSAP dispatcher, however, it will be appreciated that the call may be to request assistance from a family member, or friend. Additionally, the call may be to a towing service. The call could be any call that a mobile handset user wants to send location information to the party that has been called. Returning to the E911 call example, the location information reported to dispatcher can include the location of initial E911 call, current location during a successful E911 call, or ground track information from the initial location to the current location. When an E911 call is unsuccessfully attempted the mobile handset stores the location of the mobile handset at that time. This information can later be transmitted when the mobile handset is in a coverage area. Additionally, the mobile handset can auto-dial 911 upon entering a service area after an unsuccessful E911 attempt. Alternately the user can be prompted to initiate an E911 call when the mobile handset enters a service area.

26 Claims, 3 Drawing Sheets

LOCATION CAPABLE MOBILE HANDSET

FIELD

The present invention relates generally to communications devices, and more particularly to mobile hand held communications devices.

BACKGROUND

Some countries have an official national emergency telephone number. As an example, in the United States and Canada the telephone number is 911. When 911 is dialed the user is connected to a Public Safety Answering Point (PSAP) dispatcher. The emergency dispatcher routes the emergency call to local emergency medical, fire, and law enforcement agencies. Currently, when a telephone call is made using a landline telephone, telephone number and address information is usually automatically reported to the dispatcher.

Basic wireless 911 services require 911 calls to be transmitted to the PSAP from both subscribers and non-subscribers using any available service. However, basic wireless 911 service does not provide the dispatcher with location information as a landline telephone does. The Federal Communications Commission (FCC) has established a program requiring mobile telephone service carriers to transmit location information when an emergency call is placed within a mobile handset coverage area. This program is known as Enhanced 911 (E911). The E911 requirements apply to all cellular licensees, broadband Personal Communications Service (PCS) licensees and certain Specialized Mobile Radio (SMR) licensees operating in the United States. These mobile telephone service carriers are beginning to implement the E911 services.

The FCC's E911 rules seek to provide emergency services personnel with location information that will enable them to locate and provide assistance to wireless 911 callers more efficiently. One potential method to determine location information for the E911 requirements is to add a Global Positioning System (GPS) receiver to a mobile handset. GPS can provide emergency service personnel with location information. Location determined by GPS measurements may vary from the actual geographic location, depending on the accuracy of the measuring device used. A GPS receiver has some advantages over other position determining systems. A GPS receiver does not require a communication network for assistance. For example, a GPS receiver can update ephemeris data as necessary without assistance from a communication network. The GPS ephemeris is data that describes the orbit of GPS satellites.

GPS receivers have some drawbacks. For example, it can take a GPS receiver up to several minutes to determine location when it is first powered up. For applications involving emergency services, this delay is generally considered too long. It should be noted that while GPS receivers have some drawbacks, the use of a GPS receiver is preferred for some embodiments that will be discussed below. However, an Assisted GPS (AGPS) receiver can also be used in various embodiments. AGPS will be discussed below.

Generally, AGPS uses a GPS receiver connected to a mobile telephone system to assist the mobile handset in determining its location. A mobile telephone system can estimate the location of a mobile handset by determining the cell site that the handset is using. Estimating direction and distance from the base station can further refine the location estimate. By using the initial estimated location of the mobile handset and a GPS receiver connected to the mobile telephone system, the mobile telephone system can predict the GPS satellite signals that the mobile handset will be able to receive. Information regarding the predicted GPS satellite signals is transmitted to the mobile handset. Using this information, the mobile handset can greatly reduce the time-to-first-fix (TTFF). The TTFF for AGPS is on the order of seconds instead of minutes. Another benefit of AGPS is that the AGPS receiver can receive and demodulate signals that are weaker than those required by a GPS receiver that does not use AGPS. Additionally, the use of AGPS can reduce the cost of the implementation, as well as the power consumption and the size of the implementation. The mobile handset does not require complete stand-alone GPS circuitry. Therefore, the cost is generally lower and the power consumption and size of the circuitry are generally lower. AGPS does have some drawbacks. In cases where a mobile handset is located outside of a mobile telephone service region AGPS assistance may not be available to the mobile handset. Implementations that take full advantage of AGPS to minimize size, power, and cost will not be able to provide location information to the user when located outside of a mobile telephone service region.

As stated above, location information of the mobile handset is transmitted to a PSAP dispatcher when an E911 call is completed, however, the location information of the mobile handset when the emergency call is completed may not be the location of the emergency. The distance between the location of the completed emergency call and the actually emergence will generally be large when the emergency occurs outside of a mobile handset coverage area.

SUMMARY

Currently, it is known to provide other call recipients with location information when an emergency call is placed. Examples of emergency calls include, but are not limited to calls to family and friends for assistance, calls to towing services for assistance, and calls to government emergency services. Additionally, it is known to provide location information to the Public Safety Answering Point (PSAP) dispatchers during a completed E911 mobile call. However, if an emergency occurs outside of the mobile handset coverage area and an emergency mobile call is later placed the location of the original emergency will not be reported to the dispatcher. The location reported to the dispatcher will generally be the location where the mobile handset is located when the E911 call is successfully completed.

Briefly, the location capable mobile handset allows the user to provide a call recipient with the location of an unsuccessful attempted emergency call. In one specific example, the call may be an E911 call to a PSAP dispatcher, however, it will be appreciated that the call may be to request assistance from a family member, or friend. Additionally, the call may be to a towing service. The call could be any call that a mobile handset user wants to send location information to the party that has been called. Returning to the E911 call example, the location information reported to dispatcher can include the location of initial E911 call, current location during a successful E911 call, or ground track information from the initial location to the current location. When an E911 call is unsuccessfully attempted the mobile handset stores the location of the mobile handset at that time. This information can later be transmitted when the mobile handset is in a coverage area. Additionally, the mobile handset can auto-dial 911 upon entering a service area after an unsuccessful E911 attempt. Alternately the user can be prompted to initiate an E911 call when the mobile handset enters a service area.

Continuing with the E911 call example, providing the dispatcher with the location where an initial E911 call is attempted, or with ground track information has a number of advantages. Dispatchers frequently work with emergency life threatening situations. In these situations getting emergency personnel to the location of the emergency can greatly increase the possibility of survival. Knowing the location of an emergency is an important step in getting emergency personnel to that location. In many non-life threatening emergencies it is also important to get emergency personnel to the scene quickly. For example, if fire fighters get to the scene of a fire more quickly, generally, the fire may be put out more quickly. In addition to allowing emergency personnel to get to an emergency more quickly, providing the location or ground track information of an emergency to a dispatcher allows the emergency services to operate much more efficiently. If emergency services can respond to an E911 call more quickly then they will generally be available more quickly to respond to other emergency calls. Additionally, providing accurate location information for other forms of emergency calls can be useful to mobile handset users and others that are trying to respond to emergency calls.

BRIEF DESCRIPTION OF THE DRAWINGS AND TABLES

For a more complete understanding of the present invention, and the advantages thereof, reference is now made to the following descriptions taken in conjunction with the accompanying drawings, tables and attachments, in which.

DETAILED DESCRIPTION

Figure 1:
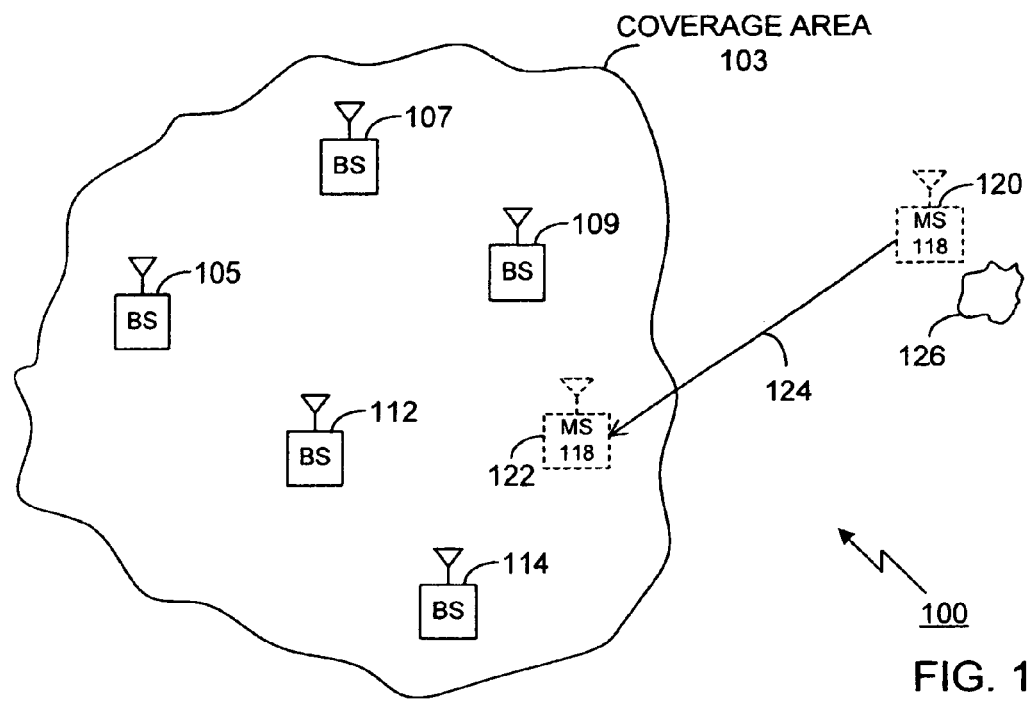
FIG. 1 shows a coverage area and a mobile handset traveling from an area outside the coverage area to an area inside the coverage area.

Referring now to FIG. 1, a mobile handset 118 capable of determining location is generally shown. The mobile handset 118 is being used in a geographic area 100. The geographic area 100 contains a coverage area 103. The coverage area is an area that is served by a mobile telephone system. Areas outside of a coverage area are referred to as no service areas. Several base stations 105, 107, 109, 112, 114 are located inside the coverage area 103. The base stations are fixed devices that mobile handsets transmit and receive from to complete a mobile call. Generally, the coverage area 103 will contain at least one base station that is compatible with the particular mobile telephone system and the no service area will generally not contain any base stations that are compatible with the particular mobile telephone system.

A mobile handset 118 is shown at a first location 120. Near the first location 120 is a location where an emergency has occurred 126. The emergency could be an auto accident, a fire, or any emergency that a mobile handset 118 user would want to report. The user attempts to place an emergency call, for example by dialing 911 on the mobile handset 118. The mobile handset 118 is unable to place a call because it is outside of the coverage area 103. Even though the call could not be made, the mobile handset 119 acquires and stores location. The mobile handset 118 travels from an area outside the coverage area 103 to a second location 122. The second location 122 is inside the coverage area 103. The path of travel 124 is also shown on FIG. 1.

When the mobile handset 118 reaches the area inside the coverage area 103 it is able to initiate and connect to the emergency number. When the mobile call is connected, location information regarding the first location 120 of the mobile handset is transmitted. Optionally, the current location information for the second location 122 can be transmitted. Normal processes are used to communicate location to the emergency dispatcher. The location information is determined using a location determination device. The location determination device is discussed in more detail with respect to FIG. 4.

Figure 2:
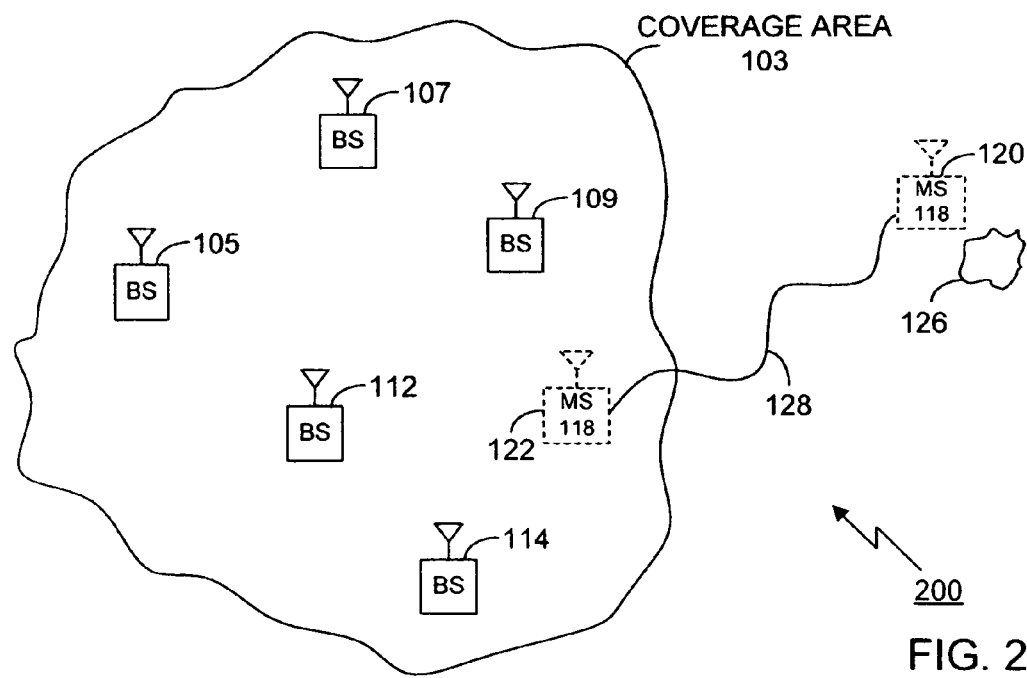
FIG. 2 shows a coverage area and a mobile handset traveling from an area outside the coverage area to an area inside the coverage area.

Referring now to FIG. 2 a geographic area 200 is shown. FIG. 2 is similar to FIG. 1. However, FIG. 2 shows another path of travel 128. The path of travel 128 is less direct than the path of travel 124 shown in FIG. 1. The path of travel 128 may be similar to a path traveled along a mountain road. As an example, two men, Kyle and Tony, are riding motorcycles at night in mountainous terrain and the mountainous terrain is in a no service area. Tony has a motor cycle accident and Kyle attempts to make a mobile emergency call using a known mobile handset. The call is not successfully completed and the accident can not be reported at the time.

Kyle continues on his motorcycle along path 128 until he reaches a coverage area 103. The coverage area 103 is quite distant from the original mountainous area that Kyle and Tony were riding in. Additionally, Kyle is now unsure of the exact location of the accident. Using a mobile handset that is able to store the location of the attempted mobile emergency call would generally enable emergency assistance to reach Tony more quickly.

Figure 3:
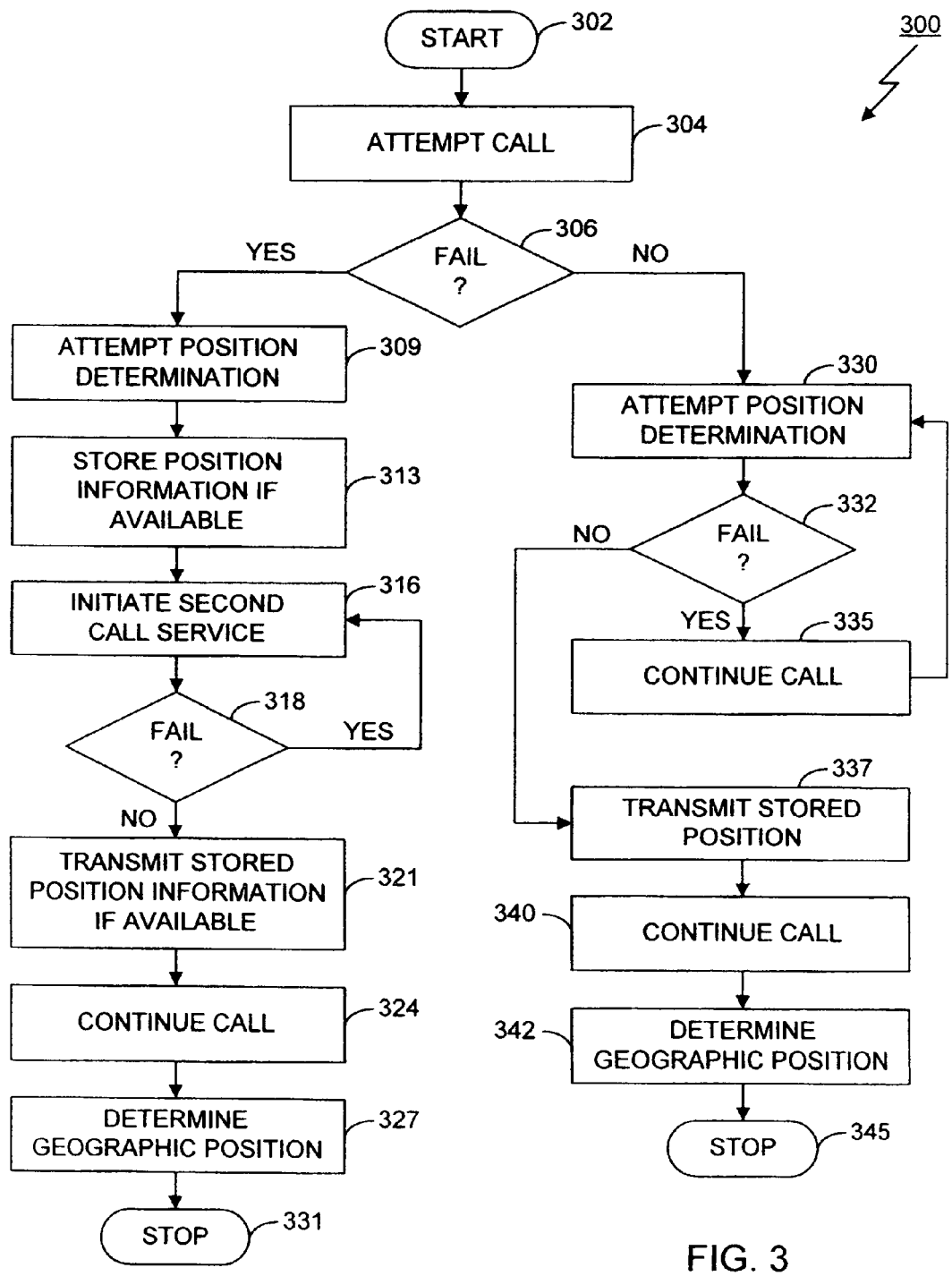
FIG. 3 shows a flow chart depicting the process on the mobile handset of FIG. 1.

FIG. 3 is a flow chart 300 depicting the process operating on handset 119. The flow chart 300 begins at 302. At step 304 a call is attempted using a mobile handset. Step 306 determines if the call failed. If the call fails step 309 attempts to determine location of the mobile handset.

If location is successfully determined it is stored, as shown in step 313. It will be understood that the store location step may include writing to a memory. Additionally, it will be understood that the memory could be a random access memory. When service is available, a call is again attempted in step 316 using the mobile handset 118. Step 318 determines if the call is successful. If the call is unsuccessful then the attempt, step 316 is repeated. If location was stored in step 313 location is transmitted in step 321 after a call is successful. The call continues at step 324, location is determined using the stored location information 327 and the process stops at 331.

If the call is successful when attempted at step 304 then step 330 attempts to determine location. Step 332 tests to determine if the location determination is successful. If the location determination of step 330 is successful then the location is transmitted, step 337. After location is transmitted 337 the call is continued 340. In step 342 geographic location is determined using the stored location information.

The process ends at 345. If the location determination of step 330 is unsuccessful the call is continued 335 and location determination, step 330 is repeated.

For example, on many mobile handsets, it is not possible to talk over the mobile handset when attempting to determine location, steps 309, 330. In another embodiment the location determination step 330 may not be repeated, or may be repeated a limited number of times, so that the user is able to talk over the mobile handset.

It will be understood to those of skill in the art that the mobile calls could be calls to a public safety answering point, or wireless 911 calls. Additionally, the call could be a call to a roadside assistance service. Roadside assistance services are used by some drivers to dispatch towing services and other roadside assistance, such as flat tire repair or refueling for vehicles that have run out of fuel.

It will be understood by those of skill in the art that the attempt location determination steps 309, 330 may include determining pseudo-range information. Additionally, the attempt location determination steps may include that use of global positioning system signals. It will also be understood by those of skill in the art that the attempt location determination steps 309, 330 may include determining latitude, longitude, and altitude information. Additionally, the attempt location determination steps 309, 330 may include estimating range and direction from a base station by measuring signals transmitted by the base station.

Figure 4:
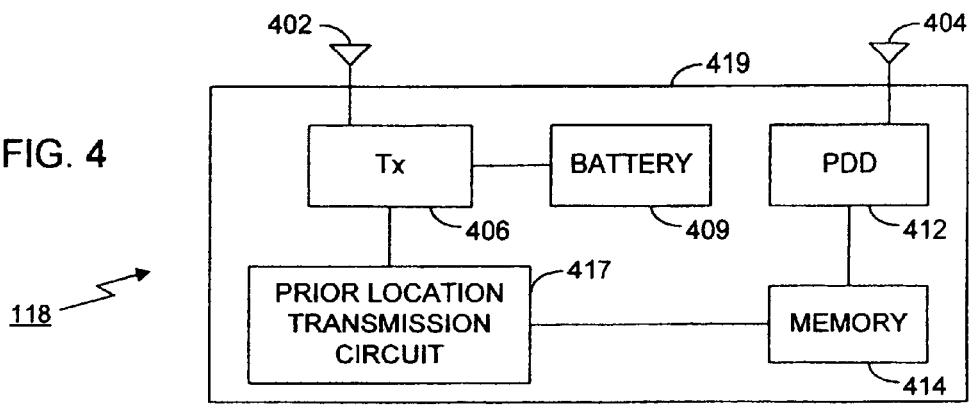
FIG. 4 shows further detail of the mobile communications device.

Referring now to FIG. 4, a mobile communications device in the form of a mobile handset 118 is shown. The mobile handset 118 includes an antenna 402. The antenna 402 is used to transmit and receive radio frequency signals and is coupled to a transceiver 406. The transceiver 406 converts incoming radio signals from the antenna to sound or other form useful to the mobile handset user. Additionally, the transceiver 406 generates a carrier and modulates the carrier to transmit information using the antenna. A battery 409 powers the transceiver 406.

The handset 118 further consists of a second antenna 404 coupled to a location determining device 412, however, some handsets me employ a system that shares a single antenna for a location determining device and a transceiver. The location determining device 412 in the handset 118 is in the form of a global positioning system (GPS) receiver. The GPS receiver can be used to determine pseudo-range information from GPS Satellites. The pseudo-range information is location information that is indicative of a geographic position and can be transmitted to a base station for further processing. Additionally, other devices can be used to further process the pseudo-range data. For example, the pseudo-range data can be processed by the mobile communications device to determine latitude, longitude, and altitude.

The location determining device 412 can also be a device that determines distance and direction from a base station. For example, direction from a base station can be estimated based on the sector and by using chip delay distance can be estimated.

It will be clear to those of skill in the art that the antenna 402 and the second antenna 404 could be a single antenna. The location determining device 412 is coupled to a memory 414. The memory 414 stores location information calculated by the location determination device 412. The stored location information is transmitted by the prior location transmission circuitry 417 that is coupled to the memory 414 and the transceiver 406. It will be understood by those of skill in the art that the prior location transmission circuitry may reside in a processor and its software, or other similar circuit.

Figure 5:
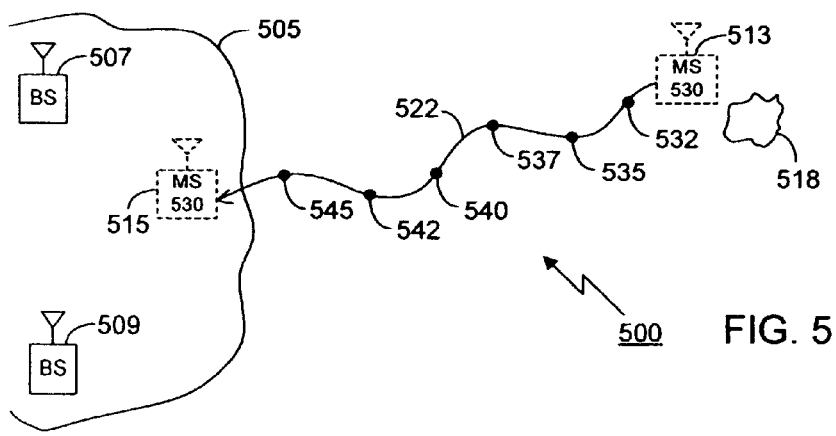
FIG. 5 shows a coverage area and a mobile handset traveling from an area outside the coverage area to an area inside the coverage area.

Referring now to FIG. 5, another embodiment will be described. FIG. 5 is similar to FIG. 1 and FIG. 2. FIG. 5 shows another geographic area 500. The geographic area 500 includes a coverage area 505 and the coverage area includes base stations 507, 509. FIG. 5 also includes a mobile handset 530 at a first location 513 that moves along a path 522 to a second location 515. Similar to FIG. 2 the path 522 of FIG. 5 is less direct than the path of FIG. 1. Additionally, similar to FIG. 1 and FIG. 2 an emergency occurs at location 518 in FIG. 5.

FIG. 5 also includes location determinations 532, 535, 537, 540, 543 along the path of travel. As the mobile handset 530 travels between location 513 and 515 the location is determined and stored in the handset 530. Stored path of travel information can then be used by emergency services personnel to help determine the most efficient way to travel to the location of an emergency. For example, the emergency may occur along a hiking trail that is not well documented. With path information, emergency personnel can follow the same trail that the caller used to get to the location 518 where the emergency occurs.

A number of different ways can be used to determine when to take location measurements. Location measurements can be taken and stored at specific time intervals. For example, location measurements could be taken and stored every 10 seconds. Location measurements can also be taken based on distance traveled. For example, whenever the mobile handset 530 travels more than 10 feet store the location entry. Generally, the more often in time or distance the entries are stored, the more precise the path information will be. If the handset 530 stops moving it may stop storing path information.

The mobile handset 530 stores path information in memory within the handset 530. As the mobile handset 530 is carried from location 513 to location 515, the memory within the mobile handset 530 may fill. As the memory within the mobile handset 530 fills it may become necessary to delete some of the location entries stored in the memory.

Several methods can be used to determine which entries to delete. In one method the mobile handset may simply stop storing new location information and the path information will be from the location 513 to the location where the memory became full. In another method the mobile handset 530 deletes location entries from the beginning of the path. Since deleting entries from the beginning of the path will tend to obscure the location of the actual emergency, it is not considered to be a preferred method. Another method of deleting location entries from the mobile handset 530 is to delete a large number of them when the memory becomes or is nearly full in a manner that will leave the general path information intact, but will increase the amount of granularity. For example, suppose that the memory in the mobile handset 530 becomes full after it stores location entry 545, if location entries 532, 537, and 542 are deleted from memory three memory locations are now available for storage, however, some path information has been lost. The path is now more granular. Additionally, it may also be advantageous to take future readings at this new level of granularity.

Figure 6:
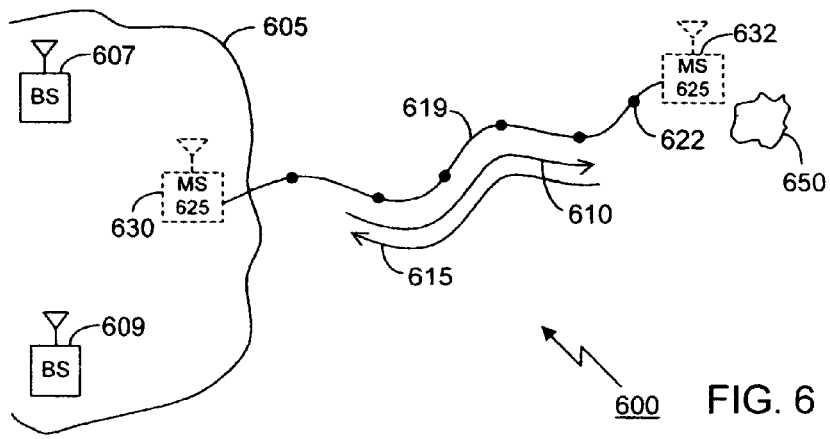
FIG. 6 shows a coverage area and a mobile handset traveling from inside the coverage area to an area outside of the coverage area and returning to the coverage area.

FIG. 6, depicting a coverage area 605 and a mobile handset 625 traveling from inside the coverage area 605 to an area outside of the coverage area and returning to the coverage area 605. If path information is stored the path information can be used to help the mobile handset 625 user return to a coverage area 605.

Similar to FIG. 5, FIG. 6 includes a geographic area 600. The geographic area 600 includes a coverage area 605 and base stations 607, 609. Additionally, the mobile handset 625 is shown a first location 630 and a second location 632. The mobile handset 625 travels along a path 619. At some time the mobile handset 625 is at the first location 630. The mobile handset 625 travels in a first direction 610 and leaves the coverage area 605. At location 632 the user of the mobile handset 625 observe an emergency occurring at location 650. However, the mobile handset 625 user is unable to place an emergency call because the mobile handset 625 is outside of the coverage area. If samples of the path of travel 619 are stored, for example, sample 622 then the mobile handset 625 user can return to an area of coverage by following the path of travel 619 in direction 615.

Additionally, the mobile handset 625 may keep track of areas of coverage such as the coverage area 605 and indicate to the user the direction and distance to the nearest coverage area. With the addition of mapping capabilities that include road locations the mobile handset can determine how to get to the nearest area of coverage independent of the path of travel.

In some cases a mobile wireless communication device may not be able to provide location information to a mobile wireless communication device user. This may be true even though location information can be provided to a receiver of a mobile call, such as a PSAP dispatcher. In these cases it may be advantageous to use a timer to keep track of the time that the mobile communication device has been outside of a coverage area. This will give the user of the mobile communication device an indication of how long it may take to get back to the coverage area. However, it will be clear to those of skill in the art that this will only be a rough estimate. In many cases other coverage areas will be closer than the last coverage area that the mobile communication device has left. Additionally, the timer may be added to mobile communication devices that are capable of providing location information to the mobile wireless communication device user, giving that user another indication of how long it may take to get back to a coverage area.

Additionally, examples involving emergency services, PSAP dispatchers, and E911 emergency calls are used extensively in the examples. It will be appreciated that other types of calls may benefit from the methods and mobile handsets discussed above. For example, automotive towing dispatchers may use the methods described above. To further illustrate this example, assume that a car breaks down in an area that is not covered by a mobile handset coverage area. The driver of the vehicle may decide to walk to another location to place a call to a towing service. It may be useful to transmit location information to the towing dispatcher so that a tow truck can be sent to the correct location.

Other embodiments of the invention will occur to those of skill in the art. The examples in the specification are only examples. While GPS receivers, and AGPS receivers were discussed, other location determination methods are possible. In some cases, as discussed above, pseudo-range may need to be stored for processing by the network when the mobile handset is in a coverage area. In other cases the mobile handset may implement multiple GPS solutions. For example a stand-alone GPS receiver may be used when outside of a coverage area and AGPS may be used inside of a coverage area. It will be clear to those of skill in the art that other combinations are possible.

What is claimed is:

1. A method of transmitting a geographical position of a wireless communication device comprising:
   detecting an unsuccessful attempt of a first mobile call;
   receiving first location information indicative of a geographic location proximate the first mobile call unsuccessful attempt;
   storing the first location information;
   successfully establishing (318) a second mobile call; and
   transmitting the first location information during the second mobile call.

2. The method of claim 1 wherein the first mobile call is a call to a Public Safety Answering Point.

3. The method of claim 1 wherein the first mobile call is a wireless 911 call.

4. The method of claim 1 wherein the first mobile call is a call to a road side assistance service.

5. The method of claim 1 wherein the location information indicative of a geographic location is pseudo-range information transmitted by a global positioning system satellite.

6. The method of claim 1 wherein the location information indicative of a geographic location is latitude and longitude information.

7. The method of claim 1 wherein the location information indicative of a geographic location is an estimate of range and direction from a base station.

8. The method of claim 1 wherein the storing step includes writing to a memory.

9. The method of claim 8 wherein the memory is random access memory.

10. The method of claim 1 wherein the second mobile call is a call to a Public Safety Answering Point.

11. The method of claim 1 wherein the second mobile call is a wireless 911 call.

12. The method of claim 1 wherein the second mobile call is a call to a road side assistance service.

13. The method of claim 1 further comprising:
    receiving a plurality of other location information data indicative of location along a path of travel;
    storing the plurality of other location information data; and
    displaying the plurality of location data to determine the path of travel.

14. The method of claim 13 wherein the storing a plurality of other location information indicative of location along the path of travel is stored upon leaving a coverage area.

15. The method of claim 13 wherein the displaying the plurality of location data to determine the path of travel step occurs on the mobile device.

16. The method of claim 13 further comprising transmitting the plurality of other location information data indicative of location along the path of travel during the second mobile call.

17. The method of claim 13 further comprising:
    starting a timer after detecting the unsuccessful attempt of a first mobile call;
    storing timer information generated by the timer; and
    displaying the timer information generated by the timer.

18. The method of claim 17 further comprising transmitting the timer information during the second mobile call.

19. A mobile handset comprising:
    a transceiver coupled to an antenna for transmitting and receiving RF signals;
    a location determining device;
    a memory; and
    a user interface, the mobile handset being characterized by:
    prior location transmission circuitry coupled to the transceiver, to the location determining device, to the memory and to the user interface, the prior transmission circuitry structured and configured to:
detect an unsuccessful attempt of a first mobile call;
receive first location information indicative of a geographic location proximate the first mobile call unsuccessful attempt;
store the first location information;
successfully establish a second mobile call; and
transmit the first location information during the second mobile.

20. The device of claim 19 wherein the first mobile call is a call to a Public Safety Answering Point.

21. The device of claim 19 wherein the first mobile call is a wireless 911 call.

22. The device of claim 19 wherein the first mobile call is a call to a road side assistance service.

23. The device of claim 19 wherein the location determining device is a global positioning system receiver.

24. The device of claim 23 wherein the global positioning system receiver determines pseudo-ranges to be stored in the memory.

25. The device of claim 23 wherein the global positioning system receiver determines latitude and longitude based on pseudo-ranges received.

26. The device of claim 19 wherein the memory is random access memory.

* * * * *